United States Patent [19]

Resnick et al.

[11] Patent Number: 4,701,920
[45] Date of Patent: Oct. 20, 1987

[54] BUILT-IN SELF-TEST SYSTEM FOR VLSI CIRCUIT CHIPS

[75] Inventors: David R. Resnick, Shoreview; Randall E. Bach, Stillwater, both of Minn.

[73] Assignee: ETA Systems, Inc., St. Paul, Minn.

[21] Appl. No.: 796,598

[22] Filed: Nov. 8, 1985

[51] Int. Cl.$^4$ ............................................. G01R 31/28
[52] U.S. Cl. ........................................ 371/25; 371/15; 324/73 R
[58] Field of Search ........................... 371/25, 27, 15; 324/73 R, 73 AT

[56] References Cited

U.S. PATENT DOCUMENTS

| 4,357,703 | 11/1982 | Van Brunt | 324/73 R X |
| 4,497,056 | 1/1985 | Sugamori | 371/25 |
| 4,504,784 | 3/1985 | Goel | 324/73 R |
| 4,513,418 | 4/1985 | Bardell | 371/25 |
| 4,519,078 | 5/1985 | Komonytsky | 371/25 |

OTHER PUBLICATIONS

J. J. LeBlanc, "A Built-In Self-Test Technique", IEEE Design & Test, 11/1984 pp. 46-52.

Primary Examiner—Jerry Smith
Assistant Examiner—Robert Beausoliel
Attorney, Agent, or Firm—Kinney & Lange

[57] ABSTRACT

An improved built-in self-test system fabricated on an LSI circuit chip for performing dynamic tests of main logic function operation. The built-in self-test system includes a control register comprising a series of static flip-flops connected for serial test data transfer and for producing test system control signals. An input shift register connected for serial test data transfer with the control register and for parallel test data transfer with the main logic function is formed by a series arrangement of static flip-flops. An output register connected for serial test data transfer with the input register, and for parallel test data transfer with the main logic function, is formed by a series arrangement of static flip-flops. A test clock enable signal is latched by a test clock enable latch, and gated with a system clock signal to produce input and output register clock signals. A test strobe signal is latched by a test strobe latch and strobed by a flip-flop for use as a control register enable signal. The latched test strobe signal and the latched test clock enable signal are gated with the system clock signal for use as a control register clock signal. A test data output multiplexer decodes a test data select signal produced by the control register and supplies test data represented thereby to a test data output pin.

30 Claims, 8 Drawing Figures

CONTROL REGISTER

| BIT | FUNCTION |
|---|---|
| N0,N1 | DECODED TO SELECT DATA ON THE TEST DATA OUT (TDO) PIN. |

| BIT 0 | BIT 1 | OUTPUT |
|---|---|---|
| LO | LO | OUTPUT REGISTER (NORMAL) |
| LO | HI | ALTERNATE DATA FROM MAIN LOGIC FUNCTION |
| HI | LO | SYS CLK |
| HI | HI | OSCILLATOR |

| BIT | FUNCTION |
|---|---|
| N2 | BLOCKS SERIAL DATA PATH IN INPUT REGISTER. |
| N3 | CONNECTS PARALLEL DATA PATH IN INPUT REGISTER. |
| N4 | BLOCKS INPUT BUFFERS AND CONNECTS OPERAND GENERATORS TO ARRAY LOGIC INPUTS. |
| N5 | BLOCKS SERIAL DATA PATH AND CONNECTS OUTPUT NODES TO PARALLEL DATA PATH IN OUTPUT REGISTER. |
| N6 | BLOCKS ARRAY LOGIC OUTPUTS TO OUTPUT BUFFERS AND CONNECTS OUTPUT REGISTER. |
| N7 | SELECTS ARRAY LOGIC OUTPUTS OR OUTPUT BUFFER OUTPUTS AS INPUTS TO CHECKSUM LOGIC. |
| N8 | FORCES ALL OUTPUT BUFFERS 'OFF' (TRI-STATE). |
| N9 | FORCES ALL OUTPUT BUFFERS 'ON' (THIS OVERRIDES BIT 8 IF BOTH ARE SELECTED). |
| N10-N23 | FUNCTIONS ASSIGNED BY LOGIC DESIGNER. |

BUILT-IN SELF-TEST SYSTEM FOR VLSI CIRCUIT CHIPS

BACKGROUND OF THE INVENTION

1. Field of the Invention

The present invention relates to apparatus for testing VLSI circuit chips. In particular, the present invention is an improved built-in self-test system for VLSI circuit chips.

2. Description of the Prior Art

Very large-scale integrated (VLSI) circuit chips manufactured with modern integrated circuit (IC) technologies routinely hold over 10,000 devices (eg. transistors). VLSI circuits with 500,000 devices have been developed. The present trend in integrated circuit design is toward even higher levels of circuit integration, thereby reducing costs and improving circuit reliability. As IC technologies continue to develop, it is expected that circuits with at least 100,000,000 devices will become common.

Increased circuit integration is not, however, obtained without drawbacks. Increasing chip testing costs tend to reduce the benefits derived from more economically efficient design and production techniques. As discussed in an article entitled "Cutting Chip-Testing Costs," IEEE Spectrum, Volume 22, Number 4, April 1985, page 38, the costs associated with integrated circuit chip testing increase in proportion to the square of the number of devices thereon. Much expense is incurred in the development of computer programs for running test routines. The engineering effort and computer time needed to devise these test routines can even exceed the requirements for designing the chip itself. Depending upon the particular type of circuit involved, circuit chip testing costs now account for roughly 10 to 40 percent of the total manufacturing costs.

The most commonly used technique of IC testing is known as scan design. Scan design requires the circuit designer to break complex logic circuits into smaller blocks, and to include artificial pathways into and between the blocks for data transmission. Complex sequential circuitry is thereby temporarily converted to combinational circuitry for testing purposes.

Scan design techniques are far from optimal. Scan design does not, in general, permit faults to be isolated to a particular chip or wire net. The inclusion of additional test points and transmission paths required for scan design degrades overall IC performance. Scan design also requires additional clock circuitry and relatively complicated maintenance software.

Another testing technique, one that is becoming increasingly popular, is the built-in self-test technique. As its name implies, built-in self-test, or BIST, test systems are fabricated on the IC chip to be tested. BIST systems include a pattern or operand generator for producing test operands. Each test operand is applied to the IC logic, and the response thereto analyzed by means of a shift register. The response to thousands, and even millions, of test operands is then compressed into a "signature", which is compared to predetermined signatures for a go/no go indication of the IC's operation. One such BIST system is disclosed in the Van Brunt U.S. Pat. No. 4,357,703.

The BIST approach to circuit testing offers numerous advantages. BIST has minimal impact upon main logic functions since it is typically fabricated on the sparsely used peripheral areas of the integrated circuit chip. Since test results are processed by the BIST system, the number of tasks which must be performed by external test equipment is reduced. Specially developed maintenance software is therefore greatly reduced. Dynamic testing at full systme clock rates significantly reduces system test times. BIST systems can also be used for testing integrated circuits at the wafer, chip, and system levels. Since they are independent of specific chip logic functions, BIST test systems can be used on any number of different types of circuit chips. The BIST approach also permits IC chips to be tested after they have been assembled into a computer, even though they are inaccessible to more traditional maintenance techniques. This will be the case, for example, when the IC is immersed in a liquid coolant to increase its performance.

Even though they offer many advantages over alternative techniques, BIST test systems have yet to be developed to their full potential. BIST systems like that disclosed in U.S. Pat. No. 4,357,703 require the logic designer to carefully synchronize BIST test system control signals with the IC system clock. Only by accurately tuning these control signals can timing violations be avoided. Unless the logic designer pays careful attention to the logic state of the system clock, data held or stored within shift registers of this system will be lost. Although alternate test data from the main logic function could be outputted from this BIST test system, the logic designer was required to actively block the alternate test data when normal test data was being analyzed. In general, the BIST system disclosed in U.S. Pat. No. 4,357,703 constrained logic design.

There is clearly a continuing need for improved BIST systems. Controlability and observability are the goals. The logic designer should, for example, be able to use the BIST system to easily control and observe all operations on the integrated circuit. It would be especially desirable if timing constraints imposed upon the logic designer by the BIST system were eased, eliminating the need for accurate tuning of BIST system control signals with respect to the IC system clock. A BIST test system which maintains data held within its shift registers irrespective of system cock status would also be desirable. A BIST system which permits one of several different types of test data to be uniquely selected, without having to block those forms of test data not selected, is also needed. In general, all elements of the integrated circuit which are used for test operations should be under dedicated control of the BIST system.

SUMMARY OF THE INVENTION

The present invention is an improved built-in self-test system means adapted for fabrication on an LSI circuit chip which incldues main logic function means for performing digital logic operations. The built-in self-test system is interconnected to the main logic function means for performing dynamic tests of main logic function operations. The improvements reduce design constraints imposed upon logic designers by the built-in self-test system.

In one preferred embodiment, test data in a serial format is received by test data input means. A clock signal which switches between first and second logic states is received by clock input means. Shift register means are responsive to the test data input means and the clock input means and are comprised of a series of static flip-flops for storing and serially transferring test data. The use of static flip-flops permits data stored within the shift register means to be maintained irrespective of the logic state of the clock signal.

In a second preferred embodiment, the built-in self-test system includes test data input means for receiving test data, test strobe input means for receiving a test strobe signal, test clock enable input means for receiving a test clock enable signal, and system clock input means for receiving a system clock signal. Test strobe latch means are responsive to the test strobe input means and the system clock input means and produce a latched test strobe signal. A control register clock signal is produced as a logical function of the system clock signal, the latched test strobe signal, and the latched test clock enable signal by first logic gate means. Control register means responsive to the test data input means serially transfer test data when clocked by the control register clock signal. The test strobe latch means and the test clock enable latch means simplify a logic designer's job in that the test strobe and the test clock enable signals need no longer be accurately synchronized, or tuned, with respect to the system clock signal. Test system design is facilitated, thereby reducing overall chip testing costs.

In yet another preferred embodiment, the built-in self-test system includes test data input means for receiving test data, and test data output means from which test data is outputted. Control register means are responsive to the test data input means and produce test system control signals including an alternate test data select signal and a normal test data select signal. Shift register means are responsive to the control register means for serial test data transfer, and responsive to the main logic function means for parallel test data transfer. Test data output control means are responsive to the shift register means, the main logic function means, and the control register means. The test data output control means causes alternate test data, from an internal signal node of the main logic function means, to be supplied to the test data output means when the control register means produces the alternate test data select signal. Test data from the shift register means is supplied to the test data output means by the test data output control means when the control register means produces a normal test data select signal. The logic designer is no longer required to block those data paths which are not selected.

DETAILED DESCRIPTION OF THE PREFERRED EMBODIMENTS

Figure 1:
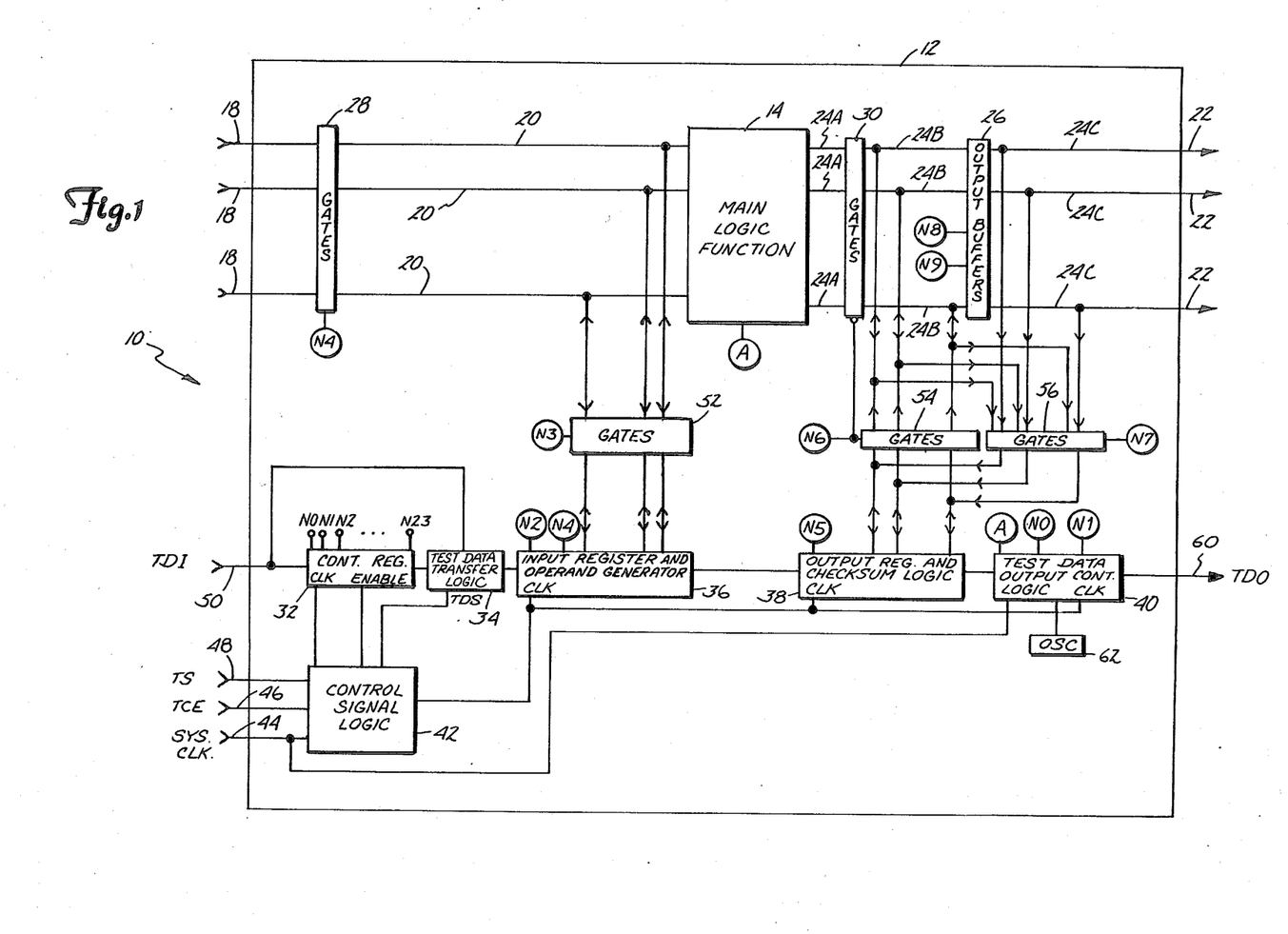
FIG. 1 is a block diagram representation of a VLSI circuit chip which includes the BIST test system of the present invention.

System Overview (FIG. 1)

The present invention is built-in self-test system for very large-scale integrated circuit chips. As illustrated in FIG. 1, built-in self-test (BIST) system 10 is fabricated on a very large-scale integrated (VLSI) circuit chip 12 which includes main logic function 14. It is to be noted that main logic function 14 will typically include tens or even hundreds of thousands of electronic devices such as transistors or FETs, and comprise a major portion of the surface area of integrated circuit chip 12. BIST system 10 can be adapted for use with all types of main logic function 14. Although represented in block form in FIG. 1, main logic function 14 can include gate arrays, memory chips, or other custom integrated circuit chips. In a preferred embodiment, BIST system 10 is adapted for use with a 20K CMOS gate array.

Integrated circuit chip 12 includes a plurality (238 in one embodiment) of input pins 18 on which input data is received. Main logic function 14 is connected to receive the input data through a plurality of input lines 20. Output data produced by main logic function 14 is outputted from integrated circuit 12 on output pins 22 through output lines 24. As shown, each output line 24 includes sections 24A, 24B, and 24C. In one embodiment, integrated circuit chip 12 has 140 output lines 24 and output pins 22. A plurality of output buffers 26, one on each output line 24 (best shown in FIG. 8), interface output line sections 24B with sections 24C. Main logic function 14 can be electrically disconnected, or isolated, from input pins 18 and output pins 22 by means of transmission gates 28 and 30, respectively. Transmission gates 30 interface output line sections 24A and 24B. Transmission gates 28 and 30 are under the direct control of BIST system 10, as will be described subsequently in greater detail.

As shown in FIG. 1, BIST system 10 includes control register 32, test data transfer logic 34, input register and operand generator 36 (hereafter referred to as input register 36), output register and checksum logic 38 (hereafter referred to output register 38), test data output control logic 40, and control logic 42. Control logic 42 is connected to receive a system clock (SYS CLK) signal from SYS CLK input pin 44, a test clock enable (TCE) signal on TCE input pin 46, and a test strobe (TS) signal from TS input pin 48. Various control signals produced by control logic 42 are supplied to control register 32, test data transfer logic 34, input register 36, output register 38, and test data output control logic 40 as shown.

Control register 32 is connected to receive test data, in serial format, through test data input (TDI) pin 50. Control register clock (CLK) and ENABLE control signals are received from control logic 42. In response to these control signals, test data is serially shifted through control register 32, with function codes included therein being produced as control signals at control nodes N0–N23. As schematically illustrated in FIG. 1, the control signals from control nodes N0–N23 are distributed throughout integrated circuit 12. The function of control signals at control nodes N0–N23 will be described in subsequent portions of this specification.

Input register 36 is connected to receive serial test data from test data transfer logic 34, and an input register clock (CLK) signal from control logic 42. Test data transfer logic 34, under the control of a test data select (TDS) control signal produced by control logic 42, causes test data to be supplied to input register 36 either directly from TDI pin 50, or from control register 32. Input register 36 is also connected for parallel test data transfer with input lines 20 through transmission gates 52.

Output register 38 is connected to receive serial test data from input register 36, and an output register clock (CLK) signal from control logic 42. Output register 38 is also connected for parallel, bi-directional test data transfer with output lines 24 through transmission gates 54 and 56. As shown, output register 38 can transfer data through transmission gate 54 to output lines 24 at a point intermediate transmission gates 30 and output buffers 26. Test data from output lines 24 at a point either between transmission gates 30 and output buffers 26, or between output buffers 26 and output pins 22, is received by output register 38 through transmission gates 56.

Test data output control logic 40 controls the transfer of test data from BIST system 10 to test data output (TDO) pin 60 in response to control signals received from control nodes N0 and N1 of control register 32. In addition to test data from output register 38, test data output control logic 40 can supply alternate test data from main logic function 14 (as schematically illustrated by node A), a copy of the SYS CLK signal, or an internal test frequency signal such as that produced by oscillator 62, to TDO pin 60.

Figure 2:
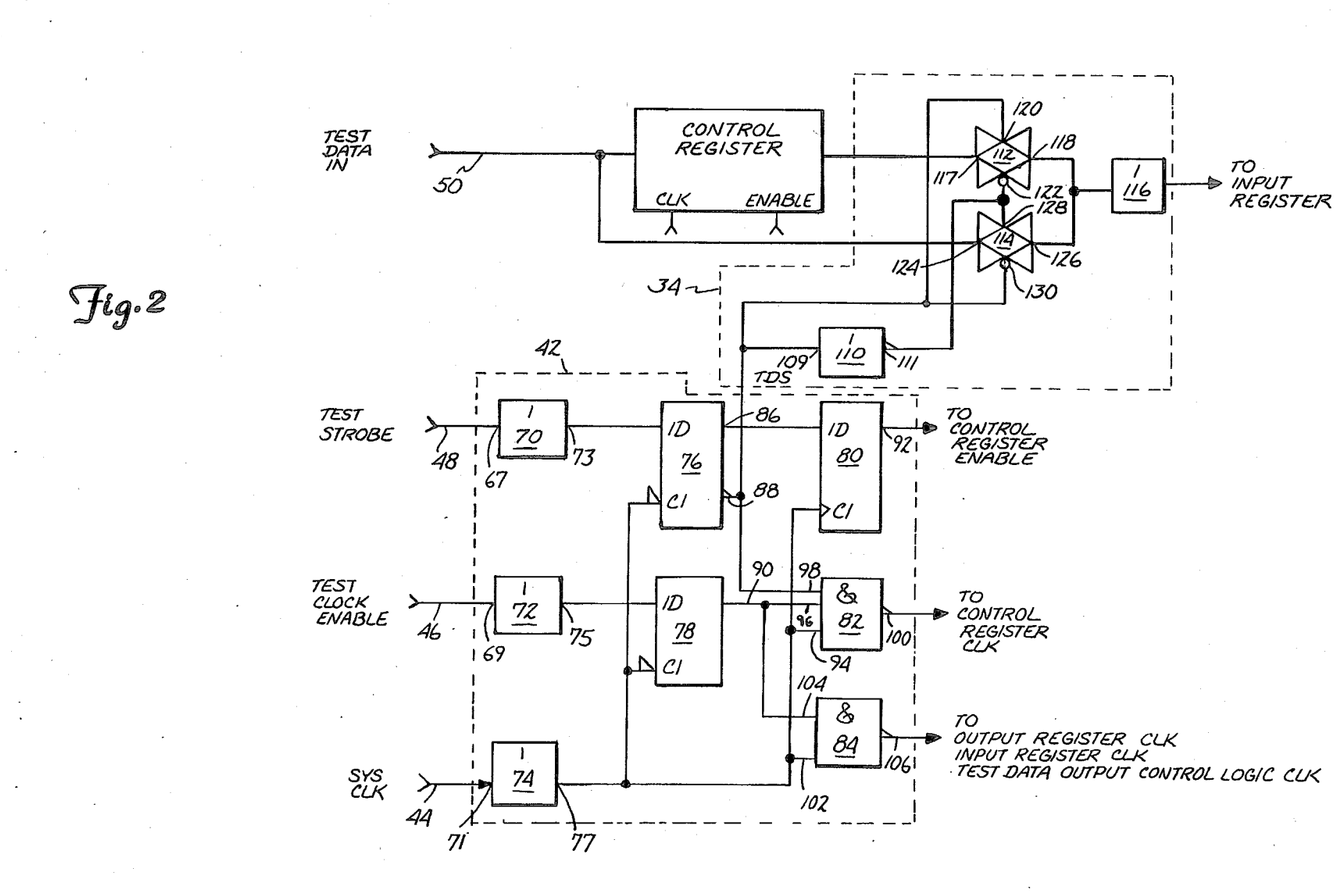
FIG. 2 is a detailed schematic representation of the control logic and test data transfer logic.

Control Logic 42 and Test Data Transfer Logic 34 (FIG. 2)

Control logic 42 and test data transfer logic 34 are schematically illustrated in FIG. 2. Control logic 42 includes buffers 70, 72, and 74, latches 76 and 78, flip-flop 80, and NAND gates 82 and 84. Latches 76 and 78 are preferably positive level triggered D-type latches, both of which have a data or D input terminal, and a clock or C input terminal. Latch 76 has a non-inverting output terminal 86 and an inverting output terminal 88, while latch 78 has a non-inverting output terminal 90.

Latches 76 and 78 are common circuit elements, and their operation is well known. The logic state (i.e. a "LOW" or logic 0 logic state, or a "HIGH" or logic 1 state) of data produced by on their non-inverting output terminals 86 and 90 will follow, or have the same logic state as, data received on the D input terminal so long as a signal received at the C input terminal has the logic 1 state. When the signal applied to the C input terminal is raised, or switched from the logic 0 state to a logic 1 state, the logic state of data then present at the D input terminal is latched, or fixed, at non-inverting output terminals 86 and 90. Subsequent changes to the logic state of the data signal received on the D input terminal will be ignored so long as the signal received at the C input terminal remains at the logic 1 state. The data signal produced on inverting output terminal 88 of latch 76 will always have a logic state opposite that of non-inverting output terminal 86.

Flip-flop 80 is preferably a positive transition edge triggered D-type flip-flop. As shown in FIG. 2, flip-flop 80 has a data or D input terminal, a clock or C input terminal, and a non-inverting output terminal 92. When the signal received at the C input terminal of flip-flop 80 is raised, or switched from a logic 0 state to a logic 1 state, the logic state of the data signal then present at the D input terminal is strobed, or fixed, onto non-inverting output terminal 92. A logic state of the signal on non-inverting output terminal 92 can change states in this manner only when the signal applied to the C input terminal is raised.

NAND gate 82 is a 3-input gate having first, second, and third input terminals 84, 96, and 98, respectively, and output terminal 100. NAND gate 84 is a 2-input gate having first and second input terminals 102 and 104, respectively, and output terminal 106. NAND gates 82 and 84 are common circuit elements which perform a logical NAND operation on signals received at their respective input terminals. Simply put, output terminals 100 and 106 of NAND gates 88 and 84, respectively, will be at logic 1 state unless all input terminals of the respective gates receive a signal having a logic 1 state, in which case output terminals 100 and 106 will be at a logic 0 state.

Buffers 70, 72 and 74 have input terminals 67, 69, and 71, respectively, and output terminals 73, 75, and 77, respectively. Buffers 70, 72, and 74 produce output signals having the same logic states as the signals received at their input terminals.

As shown in FIG. 2, the system clock (SYS CLK) signal is applied, through buffer 74, to first input terminals 94 and 102 of NAND gates 82 and 84, respectively, and to the C input terminal of latches 76, 78, and flip-flop 80. The test strobe (TS) signal is applied to the D input terminal of latch 76 through buffer 70. Latch 76 latches the logic state of the TS signal onto its output terminals 86 and 88 when SYS CLK raises from the logic 0 to the logic 1 sate, thereby producing a "latched" TS signal. The latched TS signal from non-inverting output terminal 86 is applied to the D input terminal of flip-flop 80, from which it is strobed to non-inverting output terminal 92 upon a succeeding positive transition of SYS CLK. As shown in FIG. 2, the latched TS signal is a control signal which is applied to the ENABLE control terminal of control register of 32. The logic state of the control register ENABLE signal will follow that of TS after one cycle of SYS CLK.

The test clock enable (TCE) signal is applied to the D input terminal of latch 78 through buffer 72. Latch 78 latches the logic state of the TCE signal when SYS CLK is raised from the logic 0 state to the logic 1 state, thereby producing a "latched" TCE signal on its non-inverting output terminal 90. As shown, the latched TCE signal is applied to second input terminal 96 and 104 of NAND gates 82 and 84, respectively. The latched TCE signal is gated with the SYS CLK signal by NAND gate 84. As shown, the signal present on output terminal 106 of NAND gate 84 is applied to the clock (CLK) input terminal of input register 36, output register 38, and test data output control logic 40.

Third input terminal 98 of NAND gate 82 is connected to receive the latched TS signal from inverting output terminal 88 of latch 76. NAND gate 82 thereby gates the latched TS and TCE signals with the SYS CLK signal. The gated TS and TCE signals are output NAND gate 82 at output terminal 100, and applied to the clock (CLK) terminal of control register 32 as shown.

Test data select logic 34 includes inverter 110, first and second transmission gates 112 and 114, respectively, and buffer 116. Transmission gate 112 has an input terminal 117, an output terminal 118, a non-inverting control terminal 120, and inverting control terminal 122.

Second transmission gate 114 has an input terminal 124, an output terminal 126, a non-inverting control terminal 128, and an inverting control terminal 130. Inverter 110 has an input terminal 109, and an inverting output terminal 111.

Inverter 110 and transmission gates 112 and 114 are common circuit elements, the operation of which are well known. Inverter 110 inverts the logic state of the signal received at its input terminal 109. A signal having a logic 1 state at input terminal 109, for example, would be converted to a signal having a logic 0 state at output terminal 111.

Transmission gates 112 and 114 function in an identical manner. The following description of transmission gate 112 therefore applies to transmission gate 114, and other transmission gates yet to be described. Transmission gate 112 functions much like a switch and controls the transmission of signals between its input terminal 117 and output terminal 118 in response to control signals received at its control terminals 120 and 122. Transmission gate 112 is driven to its OFF state thereby electrically disconnecting input terminal 117 from output terminal 118, and prohibiting the flow of data therebetween, when a signal having a logic 1 state is applied to inverting control terminal 122 and a signal having a logic 0 state is applied to non-inverting control terminal 120. When a signal having a logic 0 state is applied to inverting control terminal 122, and a signal having a logic 1 state is applied to non-inverting control terminal 120, transmission gate 112 will be in its ON state. In its ON state, input terminal 117 is electrically connected to output terminal 118, and data transfer permitted.

As shown in FIG. 2 the latched TS signal from inverting output terminal 88 of latch 76 is applied to test data transfer logic 34 as a test data select (TDS) signal. Input terminal 109 of inverter 110, inverting control terminal 130 of transmission gate 114, and non-inverting control terminal 120 of transmission gate 112 are all connected to receive the latched TS signal. Output terminal 111 of inverter 110 is connected to non-inverting control terminal 128 of transmission gate 114, and inverting control terminal 122 of transmission gate 112. Input terminal 117 of transmission gate 112 is connected to receive test data from control register 32. Input terminal 124 of transmission gate 114 is connected to receive test data directly from TDI pin 38. Output terminals 118 and 126 of transmission gates 112 and 114, respectively, are both applied to input register 36 through buffer 116.

When the TDS signal (latched test strobe signal) received by test data transfer logic 34 has logic 1 state, transmission gate 112 will be ON, while transmission gate 114 will be OFF. Test data from control register 32 will thereby be propogated to input register 36. When the test data select signal has a logic 0 state, transmission gate 114 will be ON, while transmission gate 112 will be OFF. Test data from test data input pin 38 will thereby be propogated to input register 36, bypassing control register 32.

Latches 76, 78, and flip-flop 80 greatly simplify the job of a logic designer designing main logic function 14 and test procedures for BIST system 10. TS and TCE signals need no longer be accurately synchronized, or tuned, with the system clock signal. By latching the TS and TCE signals, with the system clock signal, "runt" pulses, long or short set up paths, and other timing violations which can cause errors in the system operation can be reduced. This improvement is especially significant when it is understood that at the extremely high speeds at which BIST system 10 operates, it was previously virtually impossible for the logic designer to accurately predict and account for all possible timing violations. By facilitating the logic designer's job, latches 76, 78, and flip-flop 80 effectively reduce overall chip testing costs.

Figure 3:
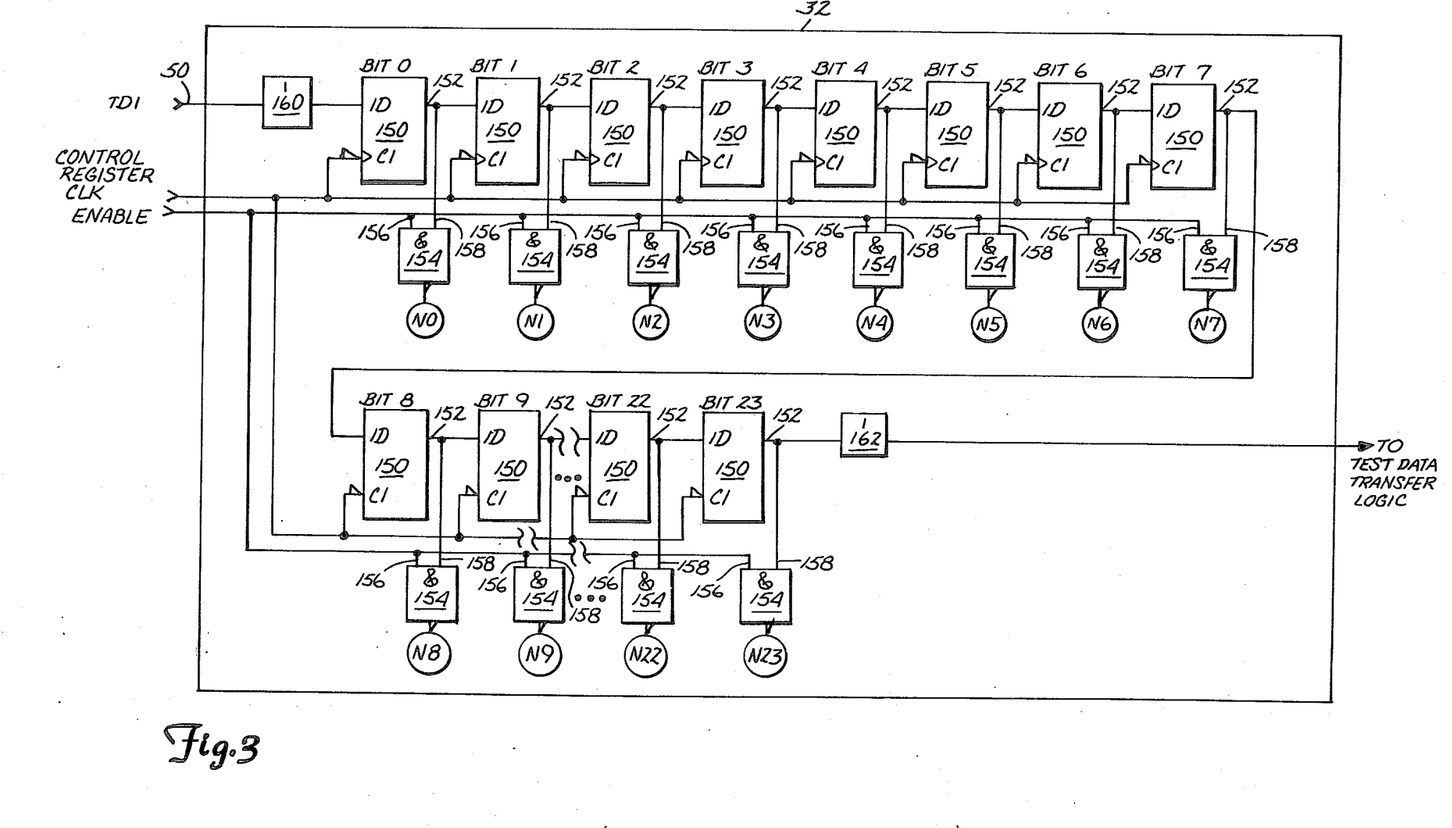
FIG. 3 is a detailed schematic representation of the control register.
Figure 4:
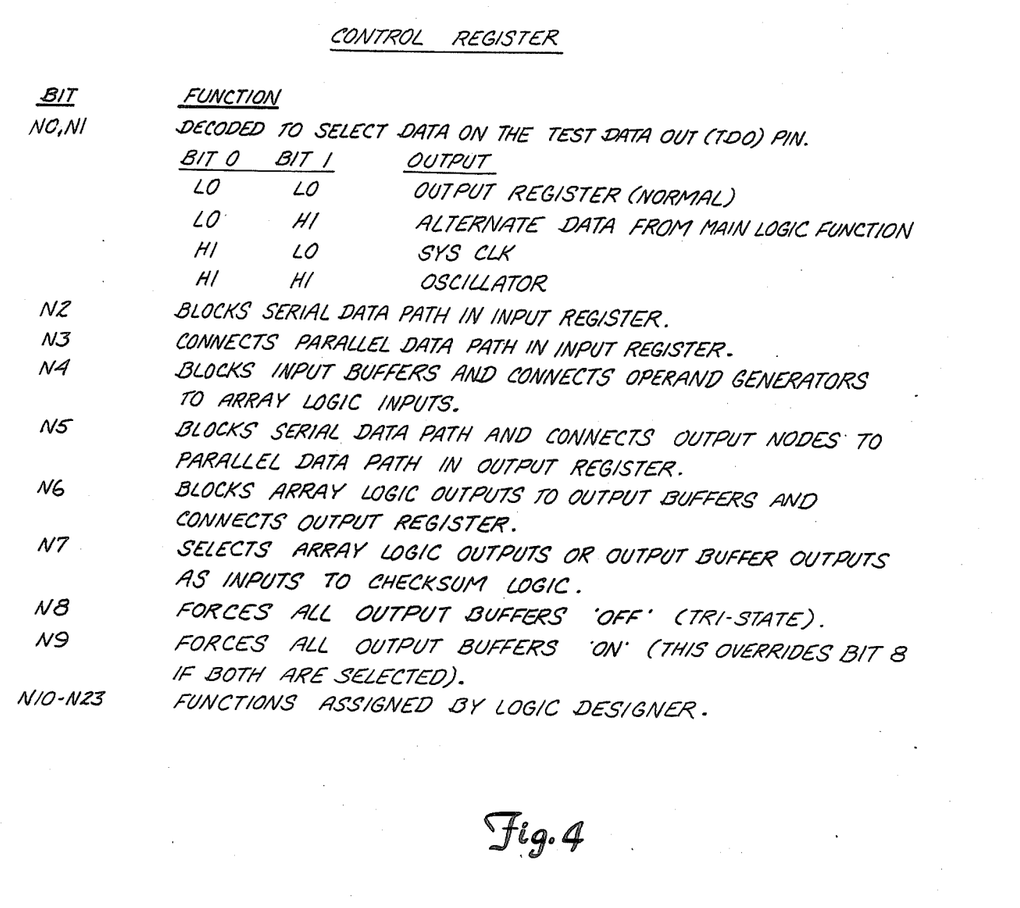
FIG. 4 is a description of the BIST functions controlled by control nodes N0–N23 of the control register.

Control Register 32 (FIGS. 3 and 4)

FIG. 3 is a schematic representation of control register 32. In the embodiment shown, control register 32 is a 24 bit (i.e. bits 0–23) shift register and is formed by a series arrangement of static flip-flops 150. Each flip-flop 150 has a data or D input terminal, a clock or C input terminal, and an output terminal 152. Test data from TDI pin 50 is inputted the D input terminal of bit 0 flip-flop 150 through buffer 160. With the exception of bit 23, output terminal 152 of each flip-flop 150 is connected to the D input terminal of the succeeding flip-flop 150. Output terminal 152 of bit 23 flip-flop 150 is connected, through buffer 162, to test data transfer logic 34. The C input terminal of each flip-flop 150 is connected to receive the control register clock signal (CLK) produced by control logic 42.

Associated with each flip-flop 150 is NAND gate 154. Each NAND gate 154 has a first input terminal 158 connected to output terminal 152 of its respective flip-flop 150, and a second input terminal 156 connected to receive the control register ENABLE signal produced by control logic 42. An output of each NAND gate 154 is a control node. Control nodes N0–N23 are associated with bits 0–23, respectively. Control nodes N0–N23 are connected to various circuit elements of BIST system 10, as illustrated in FIG. 1.

Buffers 160, 162, and NAND gates 154 are common circuit elements. The operation NAND gates such as 154 has been previously described. Flip-flops 150 of control register 32 are all static flip-flops, and are preferrably negative edge triggered. A logic state of a data signal present at the D input terminal of each flip-flop 150 will be strobed to the respective output terminal 152 upon negative (i.e. logic 1 to logic 0) transitions of the control register clock signal.

Test data is serially shifted through bits 0–23 of control register 32 at a rate of 1 bit per cycle of the control register clock signal. After 24 cycles of the control register clock signal, for example, the logic state of the data signal originally present at the D input terminal of bit 0 flip-flop 150 will have been shifted to output terminal 152 of bit 23 flip-flop 150. Control register 32 is "loaded" by serially shifting test data including function codes through flip-flops 150. The function code is representative of a desired operational state of BIST system 10, the and is "enabled" when the control register ENABLE signal is raised from a logic 0 state to a logic 1 state (i.e. when TS is raised). Once enabled, individual bits of the function code are passed to control nodes N0–N23 through respective NAND gates 154, and used as control signals. Circuit elements controlled by the control signals on nodes N0–N23 are thereby driven to their desired operational state. While TS is at a logic 1 state the control register clock is blocked (i.e. maintained at a logic 0 state) freezing the function code in control register 32. As previously discussed, TDI pin 50 will also be connected directly to input register 36, bypassing control register 32, so that the function code in control register 32 will remain valid while test data is being shifted, if desired.

In the embodiment shown, control bits N0–N9 are dedicated to the control of various gating functions required to implement all test modes of BIST system 10. Remaining control nodes N10–N23 are "spare" bits that a logic designer can use to control main logic function 14 and thereby enhance its testability. The functions of bits 0–9 and their respective control nodes N0–N9 are described in FIG. 4. These functions are also illustrated in FIG. 1 by the interconnections of control nodes N0–N9 with the circuit elements of BIST system 10. The states of all control nodes are arranged so that when the control register ENABLE signal is dropped to a logic 0 state, (i.e. when TS is dropped to a logic 0 state) all test and maintenance operations within BIST system 10 are disabled, and main logic function 14 left undisturbed for normal operation. Control nodes N0–N23 are all active "LO" (i.e., when the control signal thereon has logic 0 state).

The static flip-flops 150 used to implement control register 32, unlike alternative designs, permit data to be maintained, or stored, at output terminals 152 irrespective of the logic state of the control register clock signal (i.e. logic states of TS, TCE, and SYS CLK). In other words the logic state of the data signal at output terminal 152 of flip-flops 150 will remain constant, and thereby be stored, if the control register clock is stopped at either a logic 1 or a logic 0 level. TS and TCE need no longer be carefully tuned with respect to the system clock signal. Similarly, the logic designers attention need no longer be focused on SYS CLK. Design constraints imposed upon logic designers are thereby removed permitting greater flexibility in designing main logic function 14 for testability.

Figure 5:
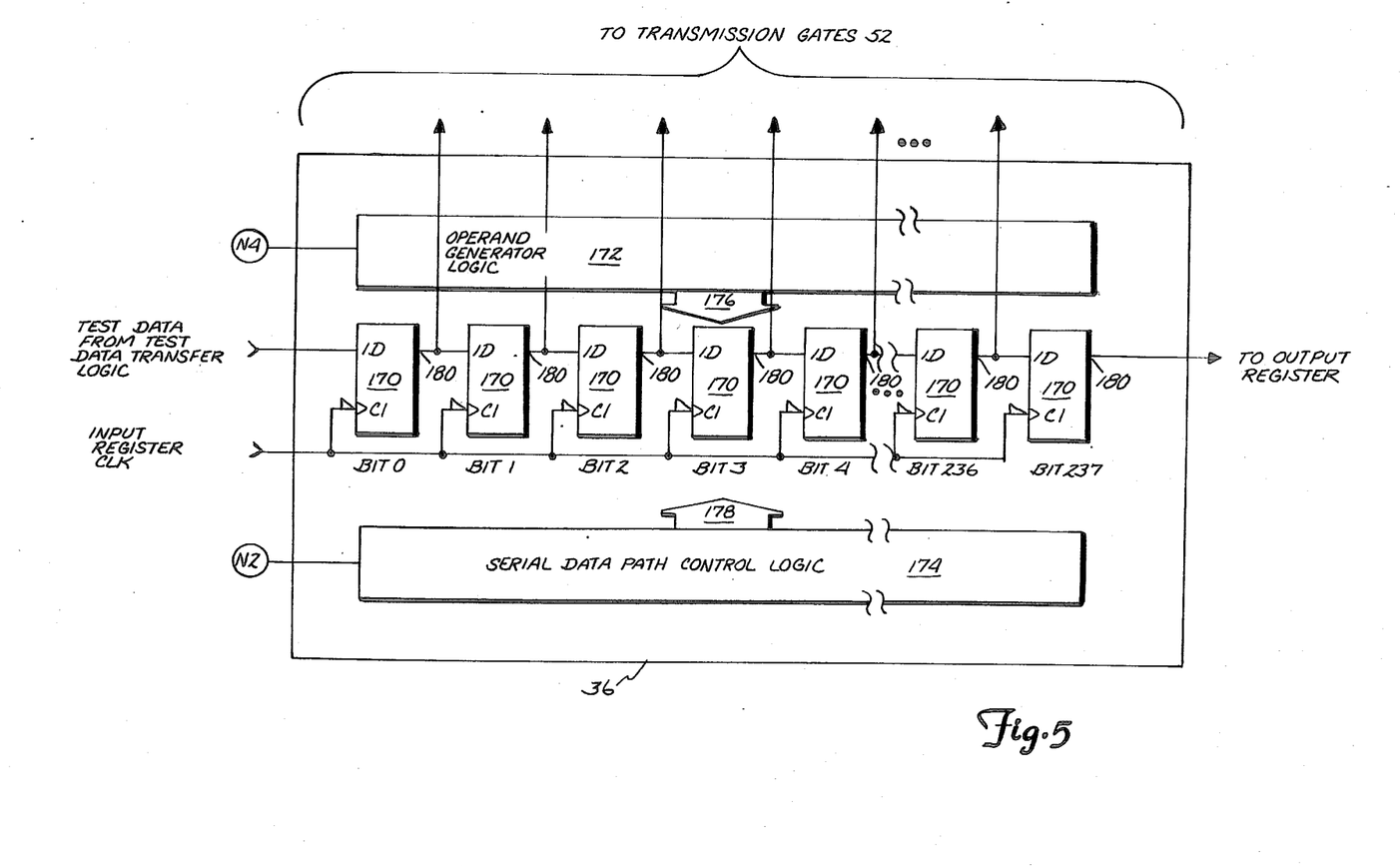
FIG. 5 is a detailed schematic representation of the input register and operand generator.

Input Register 36 (FIG. 5)

Input register and operand generator 36 (input register 36) is schematically represented in FIG. 5. In the embodiment shown, input register 36 is a 238-bit (i.e. bits 0–237) shift register formed by a series arrangement of static flip-flops 170. Each flip-flop 170 has a data or D input terminal, a clock or C input terminal, and an output terminal 180. Test data from test data transfer logic 34 is inputted to the D input terminal of bit 0 flip-flop 170. Output terminal 180 of bit 0–237 flip-flops 170 is connected to the D input terminal of the following flip-flop 170. Output terminal 180 of bit 237 flip-flop 170 is connected to output register 38. The C input terminal of each flip-flop 170 is connected to receive the input register clock (CLK) signal from control logic 42. Each flip-flop 170 is associated with one of input lines 20, and has its D input terminal operatively connected to the respective input line 20 through transmission gates 52 as illustrated.

Input register 36 also includes operand generator logic 172, and serial data path control logic 174. Operand generator logic 172 receives a control signal from control node N4 of control register 32, and is interfaced with bit 0–237 flip-flops 170 as illustrated generally by bus 176. Serial data path control logic 174 receives a control signal from control node N2 of control register 32, and is interfaced with bit 0–237 flip-flops 170 as illustrated generally by bus 178.

When control register 32 is loaded with an appropriate function code and enabled, operand generator logic 172 will repeatedly produce test operands from a nonzero starting point or "seed". These test operands are input bit 0–237 flip-flops 170 in a parallel format by bus 176. Under normal conditions, serial data path control logic 174 causes flip-flops 170 to be interconnected as a shift register for serial test data transfer between test data transfer logic 34 and output register 38. When control register 32 is loaded with an appropriate function code and enabled, serial data path control logic 174 causes bit 0–237 flip-flops 170 to be connected for parallel test data transfer with input lines 20 through transmission gates 52.

Operands produced by operand generator logic 172 can be applied in parallel to input lines 20 (and thereby into main logic function 14) when input pins 18 are isolated from main function 14 by transmission gates 28. Data on input lines 20 can also be received, in a parallel format, by bit 0–237 flip-flops 170 through transmission gates 52. Logic states of signals at input pins 18 can thereby be directly observed during system testing. Main logic function 14 can also be directly controlled during various test procedures by test data from input register 36.

All flip-flops 170 of input register 36 are static flip-flops offering the same advantages to BIST system 10 as those already described with reference to control register 32. Flip-flops 170 are preferrably negative edge triggered flip-flops which operate in a manner indentical to flip-flops 150 of control register 32.

Figure 6:
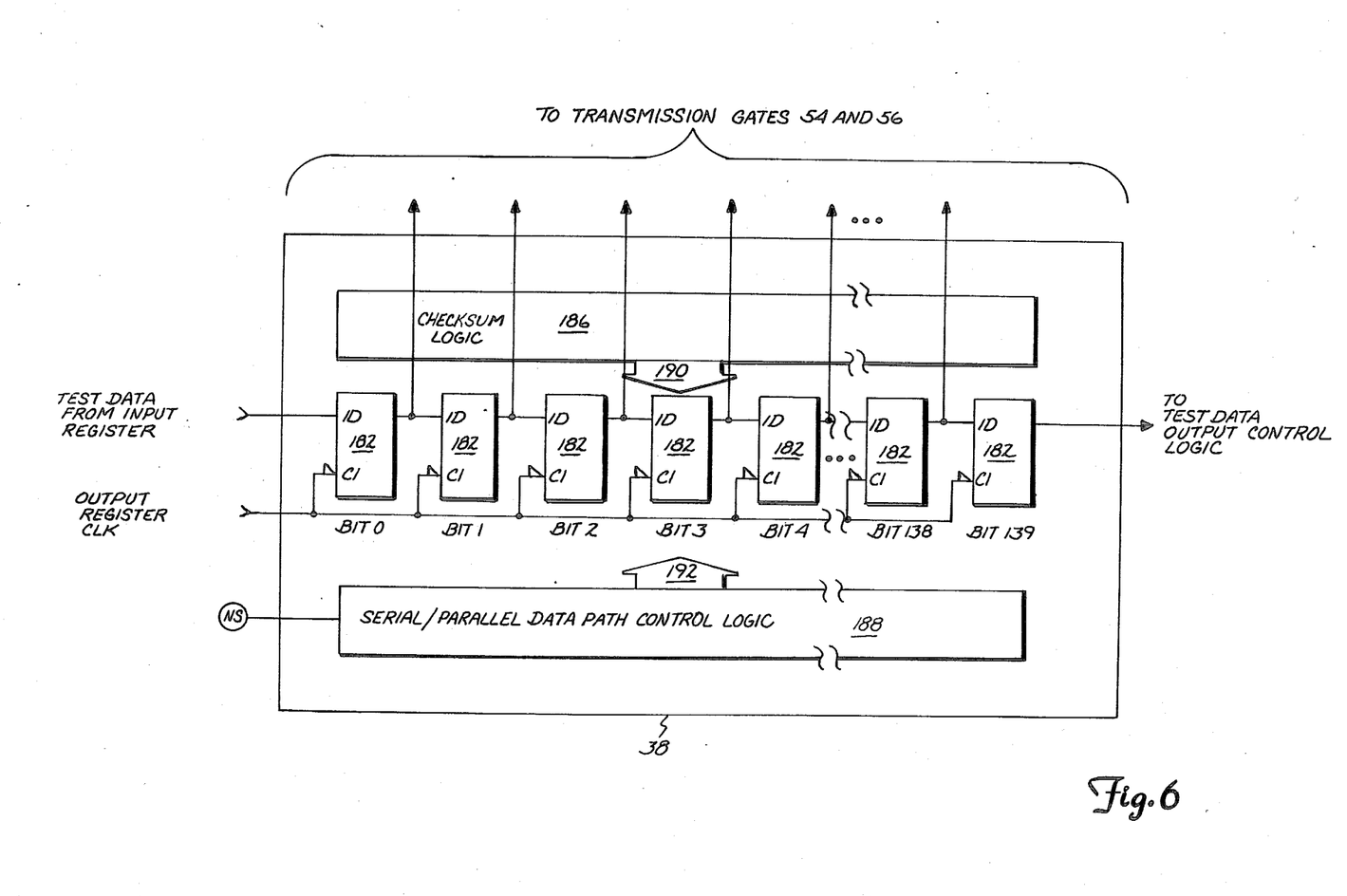
FIG. 6 is a detailed schematic representation of the output register and checksum logic.

Output Register 38 (FIG. 6)

Output register 38 is schematically represented in FIG. 6. In the embodiment shown, output register 38 is a 140 bit (ie. bits 0–139) shift register formed by a series arrangement of static flip-flops 182. Each of bit 0–139 flip-flops 182 is associated with one of output lines 24. Each flip-flop 182 has a data or D input terminal, a clock or C input terminal, and an output terminal 184. Test data from input register 36 is inputted to the D input terminal of bit 0 flip-flop 182. Output terminal 184 of bit 0–138 flip-flops 182 are connected to the D input terminal of the following flip-flop 182. Output terminal 184 of bit 139 flip-flop 182 is connected to test data output control logic 40. The C input terminal of each flip-flop 182 is connected to receive the output register clock (CLK) signal from control logic 62. The D input terminal of each bit 0–139 flip-flop 182 is also operatively connected to one of output line sections 24B through transmission gates 54 and 56, as illustrated.

Control register 36 also includes checksum logic 186 and serial/parallel data path control logic 188. Checksum logic 186 is interfaced with each bit 0–139 flip-flop 182, as illustrated generally by bus 190. Serial/parallel data path control logic 188 is connected to receive a control signal from control node N5 of control register 132, and is interfaced with bit 0–239 flip-flops 182, as illustrated generally by bus 192. When loaded with an appropriate function code, control register 32 causes serial/parallel data path control logic 188 to conenct flip-flops 182 as a shift register for serial data transfer between input register 36 and test data output control logic 40.

When loaded with other function codes, control register 32 causes serial/parallel data path control logic 188 to interconnect bit 0–139 flip-flops 182 for bi-directional parallel data transfer with output line sections 24B. Having serially loaded output register 38 with desired test data, and loading control register 32 with an appropriate function code, output pins 22 can be driven through transmission gates 54 and output buffers 26 to logic states represented by the test data. Other function codes will cause data from output lines 24 to be transferred, in parallel, through transmission gates 56 to bit 0–139 flip-flops 182 of output register 38. As illustrated in FIG. 1, this output data can come from output line sections 24B at a point intermediate transmission gates 30 and output buffers 26, or from a point intermediate output buffers 26 and output pins 22 (i.e., from output line sections 24C).

Operating output register 38 in a manner described above, the response of main logic function 14 to test operands produced by operand generator logic 172 of input register 36 can be accumulated into a checksum by checksum logic 186. This checksum is computed by half-adding current contents of output register 38 with current data on output lines 24. The checksum result is then reloaded into output register 38, and serially shifted to test data output control logic 40.

All flip-flops 182 of output register 38 are static flip-flops, offering the same advantages to BIST system 10 as the static flip-flops of control register 32 and input register 36. In the embodiment shown, flip-flops 182 are negative edge triggered flip-flops. The operation of devices of this type has been previously described.

Figure 7:
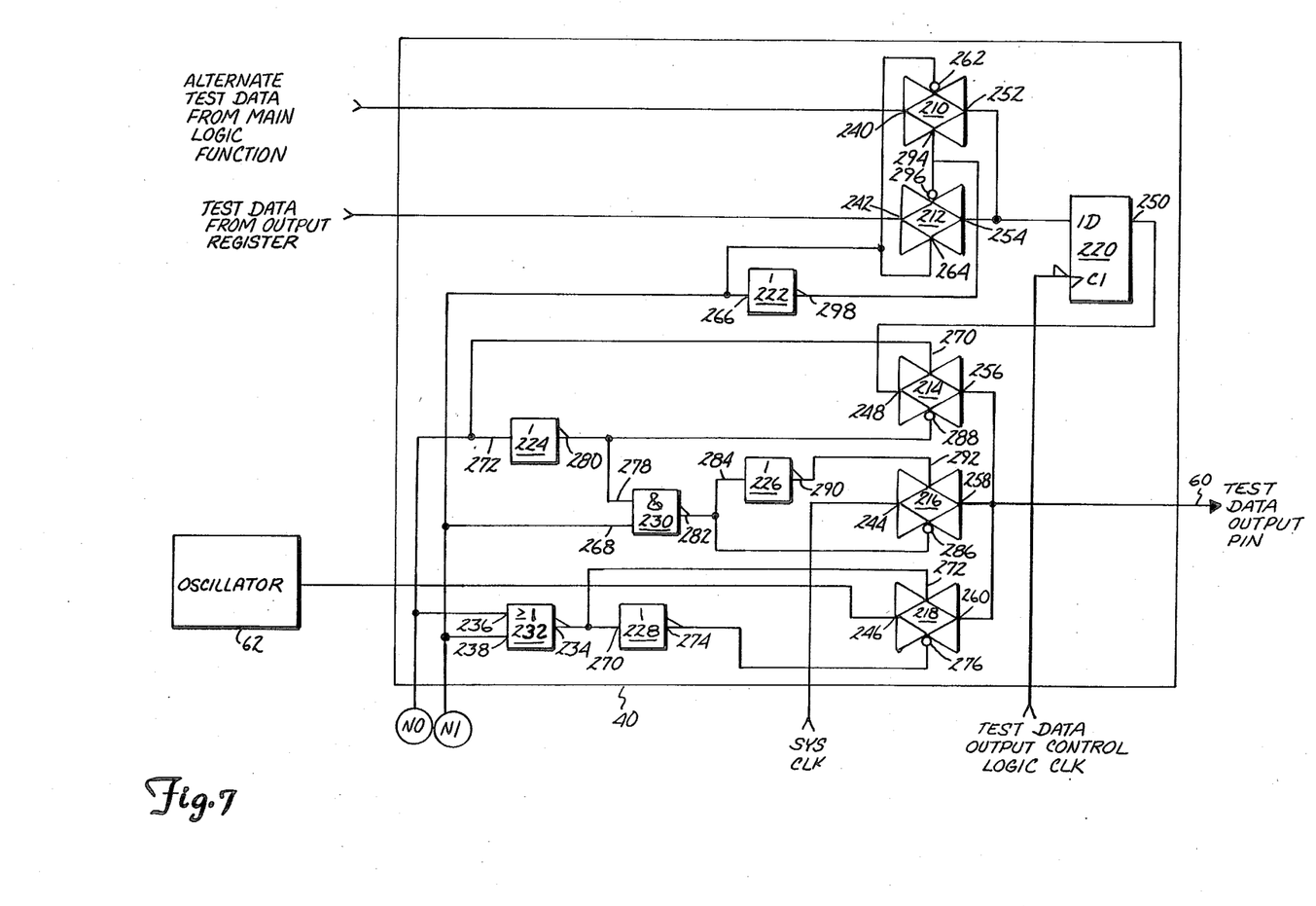
FIG. 7 is a detailed schematic representation of the test data output control logic.

Test Data Ouput Control Logic 40 (FIG. 7)

A preferred embodiment of test data output control logic 40 is schematically illustrated in FIG. 7. Output control logic 40 functions as a multiplexer which, under the control of control register 32, selects test data from one of four possible inputs for transfer to TDO pin 60. As shown in FIG. 7, output control logic 40 is connected to receive test data from output register 38, alternate test data from main logic function 14 (as illustrated by node A), the system clock signal (SYS CLK), and the internal test frequency signal produced by oscillator 62. In one preferred embodiment, oscillator 62 is formed on integrated circuit chip 12 by a ring of inverters. Control register 32, through control signals on control nodes N0 and N1, controls which of these four possible forms of test data will be transferred to TDO pin 60.

As shown in FIG. 7, test data output control logic 40 is formed by transmission gates 210, 212, 214, 216, and 218, flip-flop 220, inverters 222, 224, 226, and 228, NAND gate 230, and NOR gate 232. Transmission gates 210–218, inverters 222–228, NAND gate 230, and flip-flop 220 are functionally identical to their counterparts described with reference to control logic 42 and control register 32. NOR gate 232 performs a logical NOR operation, producing an output signal having a logic 0 state at its output terminal 234 when the signal at either of its input terminals 236 or 238 has a logic 1 state.

Input terminal 240 of transmission gate 210 is connected to receive the alternate test data from node A of main logic function 14. Input terminal 242 of transmission gate 212 is connected to receive test data from output register 38. Input terminal 244 of transmission gate 216 is connected to receive SYS CLK. Input terminal 246 of transmission gate 218 is connected to receive the internal test frequency signal from oscillator 62. Input terminal 248 of transmission gate 214 is connected to output terminal 250 of flip-flop 220. Output terminals 252 and 254 of transmission gates 210 and 212, respectively, are connected to the D input terminal of flip-flop 220. Output terminals 256, 258, and 260 of transmission gates 214, 216, and 218, respectively are connected to test data output pin 60.

Inverting control terminal 262 of transmission gate 210, non-inverting input terminal 264 of transmission gate 212, input terminal 266 of inverter 222, input terminal 268 of NAND gate 230, and input terminal 238 of NOR gate 232 are all connected to receive the control signal present at control node N1 of control register 32. Non-inverting control terminal 270 of transmission gate 214, input terminal 272 of inverter 224, and input terminal 236 of NOR gate 232 are all connected to receive the control signal present at control node N0 of control register 32.

Inverter 228 has an input terminal 270 connected to output terminal 234 of NOR gate 232, and to non-inverting control terminal 272 of transmission gate 218. Output terminal 274 of inverter 228 is connected to inverting control terminal 276 of transmission gate 218. NAND gate 230 has an input terminal 278 connected to output terminal 280 of inverter 224, and an output terminal 282 connected to input terminal 284 of inverter 226 and to inverting control terminal 286 of transmission gate 216. Output terminal 280 of inverter 224 is connected to inverting control terminal 288 of transmission gate 214. Output terminal 290 of inverter 226 is connected to non-inverting control terminal 292 of transmission gate 216. Non-inverting control terminal 294 of transmission gate 210, and inverting control terminal 296 of transmission gate 212 are both connected to output terminal 298 of inverter 222. A clock or C input terminal of flip-flop 220 is connected to receive the test data output control logic clock (CLK) signal produced by control logic 42.

Control signals received from control nodes N0 and N1 of control register 32 are decoded by test data output control logic 40 to uniquely and actively select test data which will be supplied to TDO pin 60. When control register 32 is loaded with a function code which drives control nodes N0 and N1 to logic 1, 1 states respectively, when enabled, transmission gates 212 and 214 are switched ON, while transmission gates 210, 216, and 218 are switched OFF. Test data from output register 38 is thereby transferred through transmission gate 212 and clocked by flip-flop 220 through transmission gate 214 to TDO pin 60. This is the "normal" test data output mode which can occur when the test strobe signal, and therefore the control register ENABLE signal, has a logic 0 state.

When control register 32 is loaded with a function code which drives control nodes N0 and N1 to logic 1, 0 states respectively, when enabled, transmission gates 210 and 214 are switched ON, while transmission gates 212, 216, and 218 are switched OFF. Alternate test data received from main logic function 14 is thereby transferred through transmission gate 210, and clocked by flip-flop 220 through transmission gate 214 to test data output pin 60.

Transmission gate 216 will be switched ON, and transmission gates 210, 212, 214, and 218 switched OFF, when control register 32 is loaded with a function code which causes control nodes N0 and N1 to have logic 0, 1 states respectively, when enabled. The system clock signal will thereby be transferred through transmission gate 216 to test data output pin 60.

Transmission gate 218 will be switched ON, and transmission gates 210–216 switched OFF, when control register 32 is loaded with a function code which causes control nodes N0 and N1 to have logic 0, 0 states respectively, when enabled. The internal test frequency signal from oscillator 62 will thereby be transferred through transmission gate 218 to test data output pin 60.

By using dedicated control nodes within control register 32 to select different types of data to be sent out to test data output pin 60, the logic designer is no longer required to use other available control nodes for this function. They therefore remain available for other test functions. The logic designer's task of designing tests to be executed with BIST system 10 is also greatly simplified, since he or she is no longer required to actively block those test data paths which are not selected.

Figure 8:
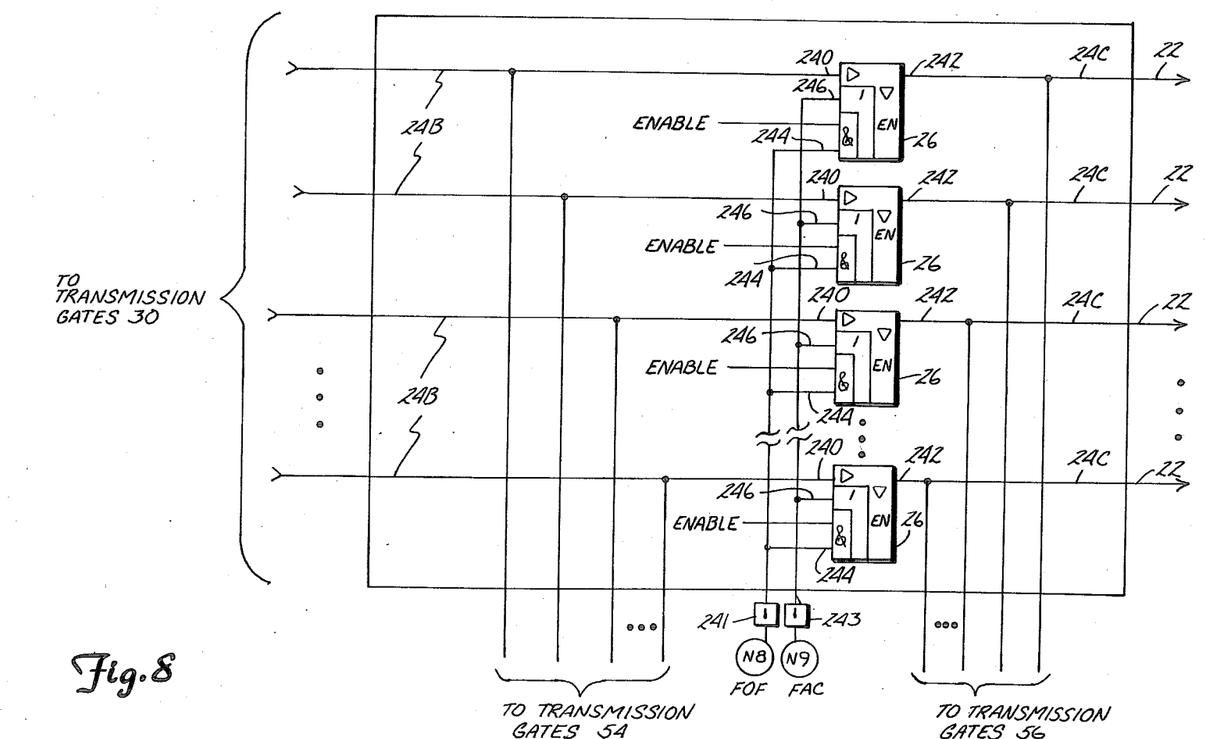
FIG. 8 is a detailed schematic representation of the output buffers.

Output Buffers 26 (FIG. 8)

Output buffers 26 are schematically represented in FIG. 8. As shown, output line sections 24B and 24C are interfaced by output buffers 26. Each output buffer 26 has a data input terminal 240 connected to its respective output line section 24B. An output terminal 242 of each output buffer 26 is connected to its respective output pin 22 through an output line section 24C. Each buffer 26 also includes an ENABLE input terminal which is adapted to be interconnected by the logic designer to points within main logic function 14. Output buffers 26 are standard tri-state buffers, having ON and OFF states controlled by a signal received at the ENABLE input terminal. When enabled, or ON, buffers 26 transfer data received at their input terminal 240 to their output terminal 242. When disabled, or OFF, output terminals 242 are driven to a high impedance state, electrically isolating input terminal 240 from output terminal 242.

In addition to the ENABLE control terminal which is available for interconnection at the logic designer's discretion, each output buffer 26 can be directly controlled by control register 23. A Force Off (FOF) control terminal 244 of each output buffer 26 is connected to control node N8 of control register 32 through buffer 241. A Force Active (FAC) control terminal 246 of each output buffer 26 is connected to control node N9 of control register 32 through inverter 243.

When control register 32 is loaded with a function code which, when enabled, causes control node N8 to have a logic 0 state, all output buffers 26 are forced OFF, or into their tri-state, high impedance mode. Output terminal 242 of each output buffer 26 is thereby electrically isolated from its respective input terminal 240. When control register 32 is loaded with a function code which, when enabled, causes control node N9 to have a logic 0 state, all output buffers are forced ON, or active. Output buffers 26 are thereby operated in their normal mode, with the logic state at their output terminal 242 being determined by the logic state of data at their data input terminal 240. The FAC signal received from function node N9 will override the FOF signal received at function node N8 if both are selected by control register 32.

The FAC and FOF control terminals on output buffers 26 permit the logic designer to drive output pins 22 from the output register 38 through function codes entered into control register 32. This greatly simplifies the logic designer's task when designing tests since he or she is no longer required to know the particular operation of a circuit being tested. Test design is thereby made easier, and less expensive.

Although the present invention has been described with reference to preferred embodiments, workers skilled in the art will recognize that changes may be made in form and detail without departing from the spirit and scope of the invention.

What is claimed is:

1. An LSI circuit including:
   main logic function means for performing digital logic operations; and
   built-in test system means interconnected with the main logic function means for performing dynamic tests of main logic function operation, the built-in test system means including:
   test data input means for receiving test data in a serial format;
   clock input means for receiving a clock signal which switches between first and second logic states; and
   shift register means responsive to the test data input means and the clock input means for storing and serially transferring test data, the shift register means comprising a series of static flip-flops which enable data stored therein to be maintained irrespective of the logic state of the clock signal.

2. The LSI circuit of claim 1 wherein the shift register means includes a control register responsive to the test data input means and the clock input means for serial test data transfer, and for producing test system control signals, the control register comprising a plurality of static flip-flops interconnected in a series arrangement.

3. The LSI circuit of claim 2 wherein the shift register means further includes an input shift register responsive to the clock input means, the control register, and the main logic function means for serial test data transfer with the control register, and for parallel test data transfer with the main logic function means, the input shift register comprising a plurality of static flip-flops interconnected in a series arrangement.

4. The LSI circuit of claim 3 wherein the shift register means further includes an output shift register responsive to the clock input means, the input shift register, and the main logic function means for serial test data transfer with the input shift register, and for parallel test data transfer with the main logic function means, the output shift register comprising a plurality of static flip-flops interconnected in a series arrangement.

5. The LSI circuit of claim 1 wherein the shift register means comprise a plurality of static D-type flip-flops interconnected in a series arrangement.

6. The LSI circuit of claim 5 wherein the flip-flops are negative edge triggered D-type flip-flops.

7. An LSI circuit, including:
   main logic function means for performing digital logic operations; and
   built-in test system means interconnected with the mian logic function means for performing dynamic tests of main logic function operation, the built-in test system means including:
   test data input means for receiving test data in a serial format;
   test strobe input means for receiving a test strobe signal;
   test clock enable input means for receiving a test clock enable signal;
   system clock input means for receiving a system clock signal;
   test strobe latch means responsive to the test strobe input means and the system clock input means for producing a latched test strobe signal;
   test clock enable latch means responsive to the test clock enable input means and the system clock input means for producing a latched test clock enable signal;

first logic gate means responsive to the system clock input means, the test strobe latch means, and the test clock enable latch means for producing a control register clock signal as a logical function of the system clock signal, the latched test strobe signal, and the latched test clock enable signal; and a control register responsive to the test data input means and the first logic gate means for serially transferring test data when clocked by the control register clock signal, and for producing test system control signals.

8. The LSI circuit of claim 7 wherein:

the test strobe latch means includes a first D-type latch having a D input terminal responsive to the test strobe input means, a C input terminal responsive to the system clock input means, a non-inverting output terminal, and an inverting output terminal, the first D-type latch producing the latched test strobe signal at the non-inverting and inverting output terminals; and the test clock enable latch means includes a second D-type latch having a D input terminal responsive to the test clock enable input means, a C input terminal responsive to the system clock input means, and a noninverting output terminal, the second D-type latch producing the latched test clock enable signal at the output terminal.

9. The LSI circuit of claim 8 wherein:

the first D-type latch is a positive level triggered latch which latches a logic state of the test strobe signal thereby producing the latched test strobe signal on negative transitions of the system clock signal; and the second D-type latch is a positive level triggered latch which latches a logic state of the test clock enable signal thereby producing the latched test clock enable signal on negative transitions on the system clock signal.

10. The LSI circuit of claim 9 wherein the first logic gate means comprises a first NAND gate having a first input terminal responsive to the first D-type latch, a second input terminal responsive to the second D-type latch, a third input terminal responsive to the system clock input means, and an output terminal, the first NAND gate performing a logical NAND operation on the latched test strobe signal, the latched test clock enable signal, and the system clock signal, and producing the control register clock signal at its output terminal.

11. The LSI circuit of claim 10 wherein:

the first input terminal of the first NAND gate is connected to the inverting output terminal of the test strobe D-type latch; and the second input terminal of the first NAND gate is connected to the non-inverting output terminal of the test clock enable D-type latch.

12. The LSI circuit of claim 8 wherein:

the control register includes an enable input terminal for receiving a control enable signal for enabling test system control signals produced by the control register; and the built-in test system means further includes a D-type flip-flop having a D input terminal responsive to the first D-type latch means, a C input terminal responsive to the system clock input means, and an output terminal, the D-type flip-flop producing the control enable signal at its output terminal by strobing the latched test strobe signal to the output terminal on transitions of the system clock signal.

13. The LSI circuit of claim 12 wherein the D-type flip-flop is a positive transition edge triggered flip-flop which produces the control enable signal by strobing a logic state of the latched test strobe signal to the output terminal on positive transitions of the system clock signal.

14. The LSI circuit of claim 13 wherein the D input terminal of the flip-flop is connected to the non-inverting output terminal of the first D-type latch.

15. The LSI circuit of claim 8 wherein:

the built-in test system further includes:

shift register means responsive to the control register and the main logic function means for serial test data transfer with the control register, and parallel test data transfer with the main logic function means, when clocked by a shift register clock signal; and second logic gate means responsive to the system clock input means and the second D-type latch for producing the shift register clock signal as a logical function of the system clock signal and the latched test clock enable signal.

16. The LSI circuit of claim 15 wherein the second logic gate means comprises a second NAND gate having a first input terminal responsive to the system clock input means, a second input terminal responsive to the second D-type latch, and an output terminal, the NAND gate performing a logical NAND operation on the system clock signal and the latched test clock enable signal thereby producing the shift register clock signal at its output terminal.

17. An LSI circuit, including:

main logic function means for performing digital logic operations; and built-in test system means interconnected with the mian logic function means for performing dynamic tests of main logic function operation, the built-in test system means including:

test data input means for receiving test data in a serial format;

test clock enable input means for receiving a test clock enable signal;

system clock input means for receiving a system clock signal;

test clock enable latch means responsive to the test clock enable input means and the system clock input means for producing a latched test clock enable signal;

logic gate means responsive to the system clock input means and the test clock enable latch means for producing a shift register clock signal as a logical function of the system clock signal and the latched test clock enable signal; and shift register means responsive to the test data input means, the main logic function means and the logic gate means for serial test data transfer with the test data transfer with the test data input means and parallel test data transfer with the main logic function means, when clocked by the shift register clock signal.

18. The LSI circuit of claim 17 wherein the test clock enable latch means includes a D-type latch having a D input terminal responsive to the test clock enable input means, a C input terminal responsive to the system clock input means, and an output terminal, the D-type latch producing the latched clock enable signal at the output terminal.

19. The LSI circuit of claim 18 wherein the D-type latch is a positive level triggered latch which latches a logic state of the test clock enable signal thereby producing the latched test clock enable signal on negative transitions of the system clock signal.

20. The LSI circuit of claim 19 wherein the logic gate means comprises a NAND gate having a first input terminal responsive to the D-type latch, a second input terminal responsive to the system clock input means, and an output terminal, and NAND gate performing a logical NAND operation on the latched test clock enable signal and the system clock signal, and producing the shift register control signal at its output terminal.

21. An LSI circuit including:
main logic function means for performing digital logic operations and including an internal signal node at which alternate test data is present; and
built-in test system means interconnected with the main logic function means for performing dynamic tests of main logic function operation, the built-in test system means including:
test data input means for receiving test data in a serial format;
test data output means from which test data is outputted;
control register means responsive to the test data input means for serial test data transfer, and for producing test system control signals including an alternate test data select signal and a normal test data select signal;
shift register means responsive to the control register means and the main logic function means for serial test data transfer with the control register means, and parallel test data transfer with the main logic function means; and
test data output control means responsive to the shift register means, the main logic function means, and the control register means, the test data output control means causing alternate test data from the internal signal node of the main logic function means to be supplied to the test data output means when the control register means produces the alternate test data select signal, and causes test data from the shift register means to be supplied to the test data output means when the control register means produces the normal test data select signal.

22. The LSI circuit of claim 21 wherein:
the built-in test system means further includes system clock input means for receiving a system clock signal;
the test system control signals produced by the control register means further include a system clock test data select signal; and
the test data output control means is responsive to the system clock input means and causes the system clock signal to be supplied to the test data output means when the control register means produces the system clock test data select signal.

23. The LSI circuit of claim 21 wherein:
the built-in test system means further includes oscillator means for producing an internal test frequency signal;
the test system control signals produced by the control register means further include a test frequency test data select signal; anda the test data output control means is responsive to the oscillator means and causes the internal test frequency signal to be supplied to the test data output means when the control register means produces the test frequency test data select signal.

24. The LSI circuit of claim 23 wherein:
the control register means produces the test system control signals as a two bit control signal having a digital state representative of selected test data; and
the test data output control means includes a digital multiplexer responsive to the internal signal node, the shift register means, the system clock input means and the oscillator means, for decoding the two bit control signal and supplying test data represented thereby to the test data output means.

25. An LSI circuit, including;
main logic function means for performing digital logic operations; and
built-in test system means interconnected to the main logic function means for performing dynamic tests of main logic function means operation, the built-in test system means including:
test data input means for receiving test data in a serial format;
system clock input means for receiving a system clock signal which switches between first and second logic states;
test strobe input means for receiving a test strobe signal;
test clock enable input means for receiving a test clock enable signal;
test strobe latch means responsive to the test strobe input means and the system clock input means for producing a latched test strobe signal by latching a logic state of the test strobe signal on transitions of the system clock signal;
test clock enable latch means responsive to the test clock enable input means and the system clock input means for producing a latched test clock enable signal by latching a logic state of the test clock enable signal on transitions of the system clock signal;
first logic gate means responsive to the test strobe latch means, the test clock enable latch means, and the system clock means, for gating the latched test strobe signal and the latched test clock enable signal with the system clock signal and producing a control register clock signal;
second logic gate means responsive to the test clock enable latch means and the system clock input means for gating the latched test clock enable signal with the system clock signal and producing a shift register clock signal;
control register means responsive to the test data input means and the first logic gate means for serial test data transfer when clocked by the control register clock signal, and for producing test system means control signals, the control register means comprising static flip-flops interconnected in a series arrangement; and
shift register means responsive to the control register means, the second logic gate means, and the main logic function means for serial test data transfer with the cotnrol register means, and for parallel test data transfer with the main logic function means, when clocked by the shift register clock signal, the shift register means comprising a plurality of static flip-flops interconnected in a series arrangement.

26. The LSI circuit of claim 25, wherein:
the built-in test system means further includes test strobe flip-flop means responsive to the test strobe latch means and the system clock input means for producing a control register enable signal by strobing a logic state of the latched test strobe signal on transistions of the system clock signal; and
the control register means is responsive to the test strobe flip-flop means for enabling the test system control signals upon receipt of the control register enable signal.

27. The LSI circuit of claim 25, wherein:
the main logic function means further includes an internal test sigal node at which alternate test data is present;
the control register means of the built-in test system means produces a test data select signal representative of selected test data; and
the built-in test system means further includes:
test data output means from which test data is outputted;
test data output multiplexer means responsive to the internal signal node of the main logic function means, the control register means, and the shift register means, for decoding the test data select signal and supplying test data represented thereby to the test data output means, the test data output multiplexer means supplying alternate test data from the main logic function means to the test data output means when the test data select signal is representative of alternate test data, and supplying normal test data from the shift register means to the test data output means when the test data select signal is representative of normal test data.

28. The LSI circuit of claim 27 wherein:
the test data output multiplexer means is responsive to the system clock input means and supplies the system clock signal to the test data output means when the test data select signal is representative of system clock test data.

29. The LSI circuit of claim 28 wherein:
the built-in test system means further includes oscillator means for producing an internal test frequency signal; and
the test data output multiplexer means is responsive to the oscillator means and supplies the internal test frequency signal to the test data output means when the test data select signal is representative of internal test frequency test data.

30. The LSI circuit of claim 25 wherein:
the LSI circuit further includes: a plurality of output pins from which data is outputted the LSI circuit; and
a plurality of tri-state output buffers, each output buffer interfacing the main logic function to an output pin and including force active and force off control terminals; and
the control register means produces force active and first force off control signals, wherein each tri-state output buffer is responsive to the control register and is forced active when the control register produces the force active control signal, and is forced off into a high impedance state when the control register produces the force off control signal.

* * * * *

UNITED STATES PATENT AND TRADEMARK OFFICE
CERTIFICATE OF CORRECTION

PATENT NO. : 4,701,920

DATED : October 20, 1987

INVENTOR(S) : David R. Resnick et al.

It is certified that error appears in the above-identified patent and that said Letters Patent is hereby corrected as shown below:

Column 14, line 50, delete "mian" and insert --main--.
Column 16, line 38, delete "mian" and insert --main--.
Column 17, line 12, delete "and" and insert --the--.
Column 17, line 68, delete "anda" and insert --and--.
Column 18, line 64, delete "cotnrol" and insert --control--.

Signed and Sealed this

Twenty-ninth Day of March, 1988

*Attest:*

DONALD J. QUIGG

*Attesting Officer*      *Commissioner of Patents and Trademarks*